March 10, 1936.  A. Y. DODGE  2,033,186
BRAKE
Filed May 31, 1930
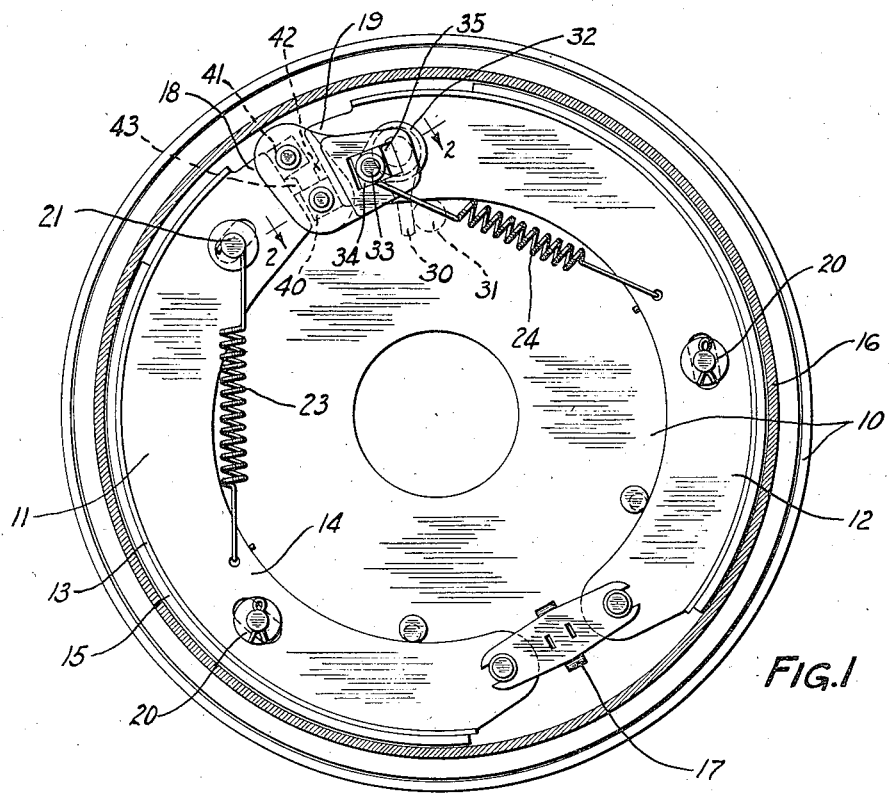
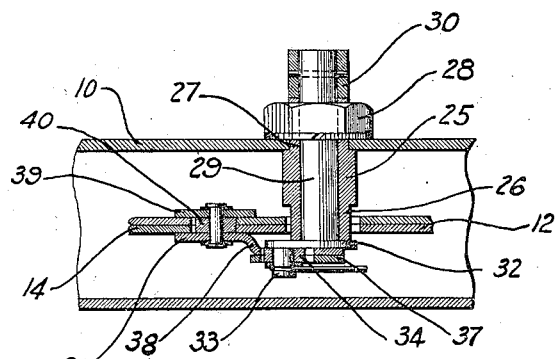
INVENTOR
ADIEL Y. DODGE
BY
M. W. McConkey
ATTORNEY Patented Mar. 10, 1936

2,033,186

UNITED STATES PATENT OFFICE 2,033,186

BRAKE

Adiel Y. Dodge, South Bend, Ind.

Application May 31, 1930, Serial No. 458,710

17 Claims. (Cl. 188—78)

This invention relates to brakes.

An object of the invention is to provide a brake actuating means for a duo servo brake which is so arranged that the shifting of the shoes from the forward braking position to the reverse braking position will not be felt in the brake pedal, i. e., will not have a tendency to react through the brake hook-up system.

The invention contemplates a structure embodying relatively few parts which may be easily and quickly stamped and assembled so that the cost in production may be greatly reduced.

Another object of the invention is to provide a simple and inexpensive means for actuating the shoes of a brake.

Another object of the invention is to provide a two shoe brake having means for effectively spreading the shoes of the brake for engagement with a drum.

An additional object of the invention is to provide a brake which will be simple and inexpensive in structure, highly efficient in use, positive in action, durable in service and a general improvement in the art.

Further objects and advantages of the invention reside in the various combinations hereinafter described and claimed as will appear upon reference to the following specification and to the accompanying drawing, in which:

Figure 1 is a side elevation of a brake embodying the invention; and

Figure 2 is an enlarged sectional view substantially on line 2—2, Figure 1.

Referring to the drawing for more specific details of the invention, 10 represents a backing plate having positioned thereon shoes 11 and 12. These shoes are of a conventional type. They are provided with a rim 13 and a web 14, and the rim has suitably secured thereto a lining 15 adapted to engage a drum 16.

The shoes 11 and 12 are connected at their articulated ends by adjustment member 17 and the other ends of the shoes are provided with shoulders 18 and 19. The shoes are retained on the backing plate by suitable steady rests 20, bolted or otherwise secured to the plate.

The shoe 11 is provided with an anchor 21 and the shoe 12 is provided with an anchor to be hereinafter described. The anchors are connected respectively by suitable springs 23 and 24 to the shoes. These springs function to return and retain the shoes in the off position.

Positioned on the backing plate 10 is a sleeve 25 having a reduced portion 26 which provides an anchor for the shoe 12. The sleeve 25 also has a reduced end portion 27 on which is threaded a nut 28 with a suitable lock washer interposed between the nut and the backing plate.

Positioned for rotation in the sleeve 25 is a shaft 29 on which is pinned or otherwise secured a crank arm 30 adaptable for engagement by an operating crank 31. The inner end of the shaft 29 has formed thereon or suitably secured thereto a crank arm 32 on which is positioned a pin 33 having a circumferential groove.

Mounted for rotation on the pin 33 is a nut or rectangular member 34 adapted to engage a slot 35 formed in a plate 36. The plate 36 has pinned or otherwise secured thereto a plate 37 which lends strength and rigidity to the plate 36. As shown, the plate 36 is bent off center, as indicated at 38, to engage the webs 14 on the respective shoes 11 and 12.

The off set portion of the plate 36 has riveted or otherwise secured thereto a plate 39 of substantially the same configuration as the off set portion of the plate 36 and mounted for rotation between the off set portion and the plate 39 are substantially rectangular members 40 and 41 adapted to engage the respective shoulders 18 and 19 on the shoes 11 and 12.

As shown, the adjacent shoulders on the shoes are provided with lugs or bosses 42 and 43 adapted to engage the rectangular member 40 and 41 to insure smooth operation, to prevent displacement of the shoes and to maintain the shoes in proper relation to the drum.

In operation, pressure is applied through the crank 31 to the crank arm 30. This sets in rotation the shaft 29 which rotates the arm 32, whereupon the rectangular member 34 is caused to travel in the slot in the plate 36 and to raise the stem or heel of the plate 36 to engage the member 41 with the shoulder 18 on the shoe 11 and the member 40 with the shoulder 19 on the shoe 12, thereby producing a twisting movement which effectively spreads the shoes for engagement with the drum and eliminating noticeable movement in the shifting of the shoes from the forward braking position to the reverse braking position.

While the preferred embodiment of the invention has been described, it is to be understood that this is given merely as an example of the underlying principles of the invention and since this may be incorporated in other specific mechanical structures, I do not intend to be limited to that shown except as such limitation is clearly imposed by the appended claims.

Having thus described the various features of the invention, what I claim is new and desire to secure by Letters Patent is:

1. A brake comprising a plurality of shoes, a spreader between the shoes having a slotted portion, a rotatable member and a member carried by the rotatable member slidable in the slot, the slot being arranged circumferentially of the brake.

2. A brake comprising two shoes connected at their articulated ends and having shoulders on their separable ends, a member positioned between the shoulders having a slot extending circumferentially of the brake, a rotatable member, means for rotating the rotatable member and a rectangular member pivotally supported by the rotatable member in the slot in the member between the shoulders.

3. A brake comprising two shoes adjustably connected at their articulated ends and provided with shoulders on their other ends, a plate having members positioned thereon between the shoulders, a rotatable shaft, a crank on the shaft and a sliding connection between the plate and the crank.

4. A brake comprising a backing plate, two shoes on the plate having their articulated ends connected by an adjustable member, a sleeve on the backing plate having a portion providing an anchor for one of the shoes, a rotatable shaft in the sleeve, means for rotating the shaft, a crank on the shaft, a plate slidably connected to the crank and means on the plate engaging the shoulders on the shoes.

5. A brake comprising a backing plate, two shoes on the plate, shoulders on the respective shoes, a spreader between the shoulders, members on the shoulders for engaging the spreader, a sleeve on the plate, a portion on the sleeve providing an anchor for one of the shoes, a rotatable shaft in the sleeve, means for rotating the shaft, a crank on the shaft and a sliding connection between the spreader and the crank.

6. A brake comprising a backing plate, two shoes movably supported thereon, a spreader having two rotatable rectangular members, lugs on the shoes adaptable for engagement with the rectangular members on the shoes, a shaft mounted for rotation, a crank on the shaft and a sliding connection between the spreader and the crank.

7. A brake comprising a backing plate, two shoes movably mounted on the plate, two plates arranged in spaced relation adapted to straddle the webs on the shoes, rotatable rectangular members between the plates adapted to engage the shoulders on the shoes, a sleeve positioned on the backing plate, a rotatable shaft in the sleeve, a crank on the shaft and a sliding connection between the crank and one of the plates.

8. A brake comprising a friction device having anchorage means at its ends, a floating applying device acting on and shiftable with said ends and having a part extending along the side of the friction device, and a lever mounted on a part of said anchorage means and not shifting with said ends and which is arranged to engage said applying part some distance from the end of the friction device.

9. A brake comprising a friction device having anchorage means at its ends, a floating applying lever having thrust parts engageable with said ends and having a part extending along the side of the friction device, and a second lever mounted on a part of said anchorage means and not shifting with said ends and which is arranged to engage said applying lever.

10. A brake comprising a friction device having anchorage means at its ends, a floating applying device acting on and shiftable with said ends, and a lever arranged to operate said applying device and which lever fulcrums on a part of the anchorage means and which engages said device alongside the friction device some distance from the end of the latter.

11. A brake comprising a floating friction device having separable ends and provided with an anchor adjacent each of said ends, floating applying means acting on said ends, and a shaft passing through one of said anchors and having at its end a part engaging the applying means between said one anchor and the end of the friction device.

12. A brake comprising a floating friction device having separable ends and provided with an anchor adjacent each of said ends, a floating applying lever shiftable with and acting on said ends and extending alongside the friction device, and a shaft passing through one of said anchors and having at its end a part operating the applying lever and engaging the lever alongside the friction device.

13. A brake comprising floating friction means having separable ends and anchorage means for said ends, an applying lever having radially-spaced parts in thrust engagement with said ends and having a part extending circumferentially of the brake alongside the friction means, and another lever supported by a part of the anchorage means and operatively engaging the circumferential part of the first lever alongside the friction means.

14. A brake comprising floating friction means having separable ends and anchorage means for said ends, an applying lever having a part extending circumferentially of the brake alongside the friction means, and another lever supported by a part of the anchorage means and operatively engaging the circumferential part of the first lever.

15. A brake comprising floating friction means having separable ends and anchorage means for said ends, an applying lever having radially-spaced parts in thrust engagement with said ends and having an operating part arranged alongside the friction means, and a second lever supported by a part of the anchorage means and acting on said operating part to apply the brake.

16. A brake comprising a drum and a friction element, means for anchoring the friction element including an operating shaft extending through an opening in the friction element, said element being arranged to shift its anchorage from one end to the other in opposite directions of rotation of the drum.

17. A brake comprising a drum and a friction element having separable ends, a fixed anchor for one end and an operating shaft extending through the other end and having a bearing, said element being arranged to anchor at one end on the fixed anchor when the drum is turning in one direction and to anchor at the other end on said bearing when the drum is turning in the other direction.

ADIEL Y. DODGE.